United States Patent [19]
Owen

[11] 3,828,881
[45] Aug. 13, 1974

[54] ANNULAR DESSICANT TANK FOR AIR LEVELING SYSTEMS

[75] Inventor: Robert E. Owen, Grand Blanc, Mich.

[73] Assignee: General Motors Corporation, Detroit, Mich.

[22] Filed: Nov. 30, 1972

[21] Appl. No.: 310,777

[52] U.S. Cl. .................. 180/75, 55/208, 280/124 F
[51] Int. Cl. ........................................... B60k 23/00
[58] Field of Search ............................... 180/70–73, 180/75, 88; 280/124 F; 55/208

[56] References Cited
UNITED STATES PATENTS

| | | | |
|---|---|---|---|
| 2,083,732 | 6/1937 | Moore et al. | 55/208 |
| 2,919,929 | 1/1960 | Jackson | 280/124 F |
| 3,279,151 | 10/1966 | Kauer, Jr. et al. | 55/208 |
| 3,397,511 | 8/1968 | Dwyer et al. | 55/208 |
| 3,603,611 | 9/1971 | Wenham | 280/124 F |
| 3,667,775 | 6/1972 | Whelan | 280/124 F |

*Primary Examiner*—Robert J. Spar
*Assistant Examiner*—Ross Weaver
*Attorney, Agent, or Firm*—Charles R. White

[57] ABSTRACT

A dryer system for a pressurized air system on a motor vehicle includes a differential having a rear housing which is normally cold at vehicle start-up and which is heated by operation of the vehicle through heat generated within the differential mechanism. A dessicant tank of annular configuration is supported on the rear cover of the differential. Dessicant in the tank dries air to prevent freeze-up within the pressurized system during cold weather. It receives heat from warm axle oil to dry the dessicant during highway driving. The tank fits between an inlet filter and a fitting on the low pressure or the return side of the system to dry incoming air and to be purged by warm outgoing air when the pressurized system is exhausted thereby to regenerate the system.

2 Claims, 3 Drawing Figures

PATENTED AUG 13 1974　　　　　　　　3,828,881

ANNULAR DESSICANT TANK FOR AIR LEVELING SYSTEMS

This invention relates to auxiliary pressure systems on motor vehicles using ambient air as a pressurizable medium and more particularly to air dryers using heat from a driven component of the vehicle to dry inlet air to the air system and to purge and regenerate dessicant during exhaust of air from the system.

Compressed air systems on vehicles have been proposed which include a dessicant tank having an inlet connected to atmosphere and an outlet connected to the compressor for drawing air through the dessicant tank during a pump-up phase of operation wherein air is directed to a pressurized component on the vehicle. The intake air is dried by the dessicant tank under low temperature conditions. Air is exhausted from the pressurized device following vehicle operation and a vehicle component which increases in temperature during the vehicle operation heats the dessicant tank so that warm air discharged from the system will purge the dessicant tank under temperature conditions higher than that of the tank during the inlet phase of operation.

In such systems, the dessicant tank is in the form of a separate tank adapted to be located adjacent to the engine of the vehicle thus occupying space within the engine compartment of the vehicle. An object of the present invention is to improve such systems by the provision of a differential mounted tank configuration which is operated at the start of vehicle operation to draw air into the dessicant tank for removal of moisture therefrom when the differential housing is cold. Following continuous operation, the differential housing is heated thereby to raise the temperature of the dessicant tank thereon to produce an effective high temperature regenerative purge of moisture from the dessicant tank during an exhaust phase of operation.

Still another object of the present invention is to provide a compact air dryer system for use on vehicles having a pressurized air system including a differential housing having a rear cover and a dessicant tank having an inner wall connected to the rear cover in close spaced relationship therewith and an outer cover sealed with respect to the inner cover and engaging it to form an annular compartment, one end of the compartment being connected to a conduit in communication with atmosphere and the other end of the compartment communicating with a tee fitting which serves to direct exhaust air in counterflow relationship through the compartment during an exhaust phase of operation following temperature increases in the dessicant tank as produced by heat output from the differential housing in response to vehicle operation and wherein the tee further serves as a bypass connection for directing air through a closed pressurized system without passing it through the dessicant tank during normal system operation.

Yet another object of the present invention is to provide a compact dessicant cartridge for use in a rear suspension leveling system including a generally circular tank adapted to be connected on the rear differential housing of a vehicle and including an inner wall having a curved surface thereon following the contour of the end cover of the differential housing and means connected thereto for securing the tank on the differential housing and an outer wall with a flat surface portion engaging the curved surface of the inner wall to form an annular passageway between the walls filled with dessicant means for removing moisture directed to an inlet in communication with one end of the annular passageway and wherein the other end of annular passageway is adapted to be connected to a compressor on the differential housing and operated by the differential to supply compressed air to the leveling system and a connection to receive air from the leveling system and to circulate it continuously in a closed loop of the leveling system defined in part by the compressor during normal operation and to return exhaust air from the leveling system in counterflow fashion through the annular passageway during an exhaust phase of operation and wherein the dessicant has the temperature thereof increased by heat output from the differential produced by vehicle operation to produce an effective high temperature regenerative purge of the dessicant means during counterflow operation.

These, and other features, objects and advantages of the present invention will become more apparent from the following detailed description and drawings in which.

Figure 1:
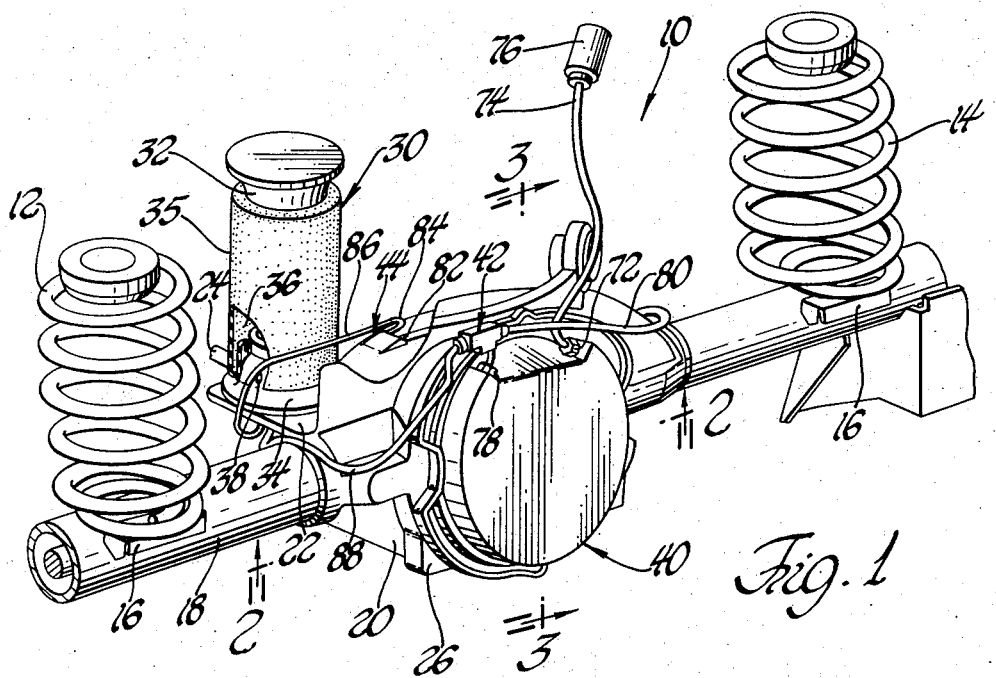
FIG. 1 is a view in perspective of a rear suspension leveling system including the air dryer system of the present invention.
Figure 2:
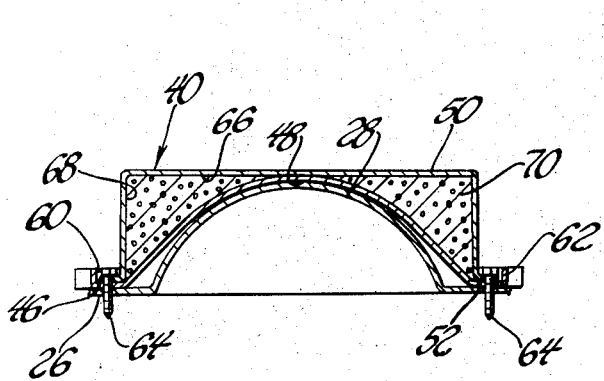
FIG. 2 is a horizontal sectional view taken along the lines 2—2 of FIG. 1.
Figure 3:
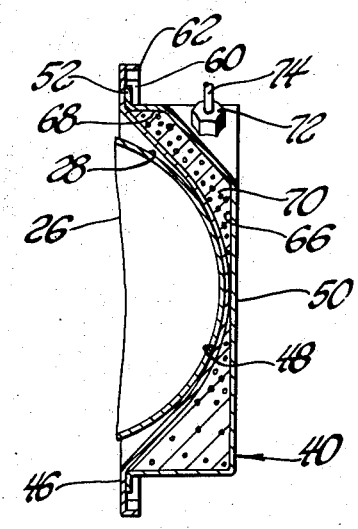
FIG. 3 is a view in vertical section taken along the lines 3—3 of FIG. 1.

Referring to FIG. 1 of the drawings, a rear suspension system 10 is illustrated which includes a pair of coil springs 12, 14. Each of the coil springs is supported at the lower end by a bracket 16 on one end of an axle housing 18.

The system further includes a differential housing 20 having a ledge 22 located on one side thereof adjacent the nose of the housing 20 through which the propeller shaft 24 is directed. The differential housing 20 encloses conventional differential gear means and axle oil. It represents a vehicle component which is normally cold when the vehicle is initially started up. Following vehicle operation, the gear means will generate heat which will increase the temperature of the axle oil. The heated axle oil will generate heat which will increase the temperature of a rear cover 26 on the housing 20. The rear cover 26 has a spherical outer surface 28 thereon located at the rear of the housing 20.

The system also includes a pressurizable air spring device 30 having a pair of pistons 32, 34 at opposite ends thereof, each sealingly connected to rolling lobes on the end of a resilient flexible sleeve member 35. The sleeve and pistons form a pressurizable chamber 36. It includes a valve control 38 more particularly of the type shown in copending U.S. application Ser. No. 307,218 filed Nov. 17, 1972 by Robert E. Owen for "Height Control Valve for Air Spring with End Piston Boot Operated", for regulating the level of pressure within the chamber 36.

In accordance with certain principles of the present invention, air supply to the pressurized air spring unit 30 of the system 10 is directed through an improved dessicant tank 40 during both an inlet phase of operation and an exhaust phase of operation. The system includes a tee fitting 42 that serves to communicate the dessicant tank 40 with a compressor 44 in the system which maintains the pressure within the chamber 36. It also serves to direct exhaust flow from the air spring unit 30 into the tank during the exhaust phase of operation.

More particularly, the tank 40 includes an inner wall 46 which has a curved inner surface 48 located in close spaced relationship with the outer surface 28 of the rear cover 26. Thus, it is located in good radiant heat transfer relationship with cover 26 so as to follow the temperature of a differential housing 20 as it increases during operation of the vehicle.

An outer wall 50 of the tank includes a peripheral flange 52 thereon seated within a channel 60 formed by an outwardly bent end 62 formed continuously around the outer periphery of the inner wall 46. Fastener means 64 are located at spaced circumferential points around the flange 52 and are directed through the channel 60 into interlocking engagement with the rear cover 26 to rigidly secure the tank 40 in place on the rear of the differential housing 20.

The curved surface 48 of the inner wall 46 is located in engagement with the inner surface 66 of the outer wall 50 to form a continuous horseshoe-shaped annular chamber 68 within the tank 40. The continuous annular chamber 68 is filled with a moisture dessicant material 70 for removing moisture from inlet air passing through the chamber 68. In the illustrated arrangement, the outer wall 50 has an inlet fitting 72 connected thereto communicating with one end of the annular chamber 68. It in turn is connected to a vent line 74 having an air filter 76 thereon. The outer wall 50 further includes a fitting 78 thereon in communication with the opposite end of the horseshoe-shaped annular chamber 68. It connects to one leg of the tee 42. Another leg of the tee is connected to one end of a supply conduit 80 having the opposite end thereof connected to an inlet 82 of the compressor 44. An outlet 84 of the compressor 44 is connected by a pressure line 86 to the air spring limit 30 for supplying pressurized air thereto. An exhaust line 88 is connected to the valve control means 38 of the air spring assembly 30 at one end thereof. It has the opposite end thereof connected to the remaining leg of the tee 42.

Compressor 44 is of the type which is driven directly off of a differential pinion in a manner more specifically set forth in copending U.S. application Ser. No. 307,331 filed Nov. 16, 1972, to Manfred P. H. Schlanzky for "Differential Mounted Single Stage Diaphragm Operated Pump".

In operation the system includes a pump-up or inlet phase, a bypass phase of operation and an exhaust phase of operation. The pump-up phase of operation is initiated when the vehicle is started up. Under these conditions the differential housing 20 is substantially at ambient temperature conditions. The compressor 44 is driven by operation of the vehicle differential. At initial startup, load is added to the vehicle. This causes the air spring suspension device 30 to compress and will cause the valve 38 thereon to close communication between the pressurizable chamber 36 and the exhaust line 88. The compressor 44 will draw outside air through the air filter 76 thence through the vent conduit 74 and through the annular chamber 68 within the dessicant tank 40 from the inlet 72 thereof to the outlet 78 thereof.

The inlet air can have a substantial amount of moisture therein especially on humid days. At startup the dessicant means 70 within the annular chamber 68 will be substantially at ambient air temperature. Thus the moisture in the inlet air will be deposited on the dessicant means at a temperature near ambient temperature. Moisture is removed from the inlet air as it passes from the inlet 72 of the tank 40 to the outlet 78 thereof. The dried air is thence passed through the tee fitting 42 and drawn by the compressor through the inlet conduit 80 to the inlet 82 of the compressor from whence it is discharged through the outlet 84 through the pressure conduit 86 into the pressurizable chamber 36. Since the valve 38 is closed, pressure will increase in chamber 36 so that the air spring unit 30 will produce a supplemental uplift force to support the additional load.

During normal operation, after the vehicle is leveled, the valve 38 will open and close in accordance with road movements to exhaust pressurized fluid continuously with the chamber 36. The amount of exhaust of pressurizable fluid is substantially that of the displacement of the compressor 44 which is operated continuously to draw the exhaust gas through the tee fitting 42 in bypassed relationship to the tank 40 and return it to the system through the conduits 80, 86. Thence, during normal operation little or no air is drawn through the inlet 76 and primary flow of fluid is through a bypassed loop defined by the conduit 80, the conduit 86, the conduit 88, and the tee 42. During normal operation gear means within the differential housing 20 will generate heat which will increase the temperature of the axle oil which in turn will heat the rear cover 26 of the differential housing 20 to elevate its temperature substantially above surrounding air ambient temperatures. The vehicle differential components are only operated in response to vehicle operation and the energy therefrom is transferred to the dessicant means in the tank 70 by direct radiation from the curved surface 28 on the rear cover 26 to the inner wall 46 of the tank 40. The conduits 80, 86, 88 are arranged also to be heated by the increased temperature of the differential housing so that gas circulating in the system and the dessicant means 70 within the tank will reach an equilibrium temperature which is closely approximate to the equilibrium temperature of the axle housing 20.

In accordance with certain principles of the present invention, this increased temperature of operation of the tank 40 is produced solely in response to vehicle operation without requiring provision of separate heaters or means for controlling separate heaters to provide a regenerative purge cycle of operation to dry the dessicant means 70.

In this system a regenerative high temperature purge of moisture from the dessicant means 70 is produced during the exhaust phase of operation. The exhaust phase is initiated when the vehicle is stopped and unloaded. Under these conditions there is a reduced load on the rear suspension and the primary springs 12, 14 will act to cause the pressurizable air spring means to increase in length and thereby increase the distance between the piston 32 and the piston 34. This will cause the diaphragm 34 to move out of engagement with the valve 38 and will in turn communicate the pressurizable chamber 36 with the exhaust conduit 88. Concurrently, since the vehicle is stopped, the compressor 44 is no longer operating. Thus it blocks communication between the supply conduit 80 and the pressurizable air spring 30. For this reason, air exhaust from the pressurizable chamber 36 will flow through the conduit 86 into the tee 42, and thence to the inlet 78 to flow in counterflow fashion through the chamber 68 to the outlet 72 thereof; thence through the vent conduit 74 and out th filter 76 to atmosphere. This counterflow of heated gas will produce a regenerative purging of moisture from the dessicant means 70 and will cause moisture therein to be discharged back to atmosphere. It takes place under temperature conditions substantially elevated with respect to temperature conditions at which moisture is deposited on the dessicant means and will produce an effective regeneration of the dessicant means during the exhaust phase of operation.

In the aforesaid system the mechanical components have the following ratings:

| ITEM | RATING |
| --- | --- |
| Tank 40 Volume | 100 cubic inches |
| Dessicant means Silica Gel | 60 cubic inches |
| Compressor | 0.20 cubic inches displacement |
| Air Spring 30 | 110 cubic inches at curb weight |

With the system of the aforementioned type, the system will be pumped up to level added load on a vehicle within 0.3 and 1 mile of operation for a five passenger load and gross vehicle weight respectively. During this time the volume of the pressurizable air spring will increase, the increase in volume constituting the amount of humid inlet air drawn through the tank 40. It has been found that a system including components listed above that all moisture is removed from the incoming air and that the air circulating in the system will be of a dryness quality that will prevent any substantial condensation of liquid in the system.

It has been observed that the regeneration of the dessicant means 70 by virtue of the exhaust phase of operation at the elevated operating temperature of the differential 20 following vehicle operation will serve to maintain the dessicant means 70 at a dryness level that will remove moisture from humid intake air directed thereto on subsequent pump-up operation.

While the embodiments of the present invention as herein disclosed constitute a preferred form, it is to be understood that other forms might be adopted.

It is claimed:

1. A moisture eliminating system for use in a pressurizable vehicle air leveling system of the type including a pressurizable vehicle height control device with valve control for filling and exhausting the device and a compressor operatively connected to said height-control device actuated in response to vehicle operation to supply pressurized air to the device and to block flow of pressurized air into the device during exhaust of air therefrom comprising: a differential, a housing for said differential normally cold at vehicle startup, means including axle oil within said housing for heating said housing during vehicle operation, said housing including a rear cover, a dessicant tank on said rear cover, said tank including an inner wall with an inner surface located in close spaced relationship to said rear cover for conducting heat energy generated in said differential housing into said tank, fastener means for connecting said inner wall to said differential housing for rigidly supporting said dessicant tank thereon, said tank including an outer wall having a flat surface portion thereon in engagement with said inner wall for forming an annular chamber in said tank, dessicant means filling said chamber and heated by the heat energy generated by said differential, a fluid fitting connected to said tank to define an inlet to said chamber, an outlet from said chamber, a tee fitting connected to said outlet, a vent conduit connected to said inlet to direct ambient inlet air into said tank during pressurization of the device and for exhausting fluid from the system upon exhaust of pressurized fluid from the device, a supply conduit connected to said tee fitting and adapted to be connected to the compressor inlet for supplying air thereto during a pump-up phase of operation, a supply line connected to said tee fitting and adapted to be connected to the pressurizable device for returning air from the device to the tank during exhaust of air from the device, said tank being at a reduced temperature at vehicle start-up and receiving inlet air therethrough as the device is pressurized by the compressor to cause moisture to be removed from the inlet air at a reduced temperature, said tank and tee fitting being heated by said differential housing during vehicle operation to raise the air temperature therein to an elevated temperature, said exhaust conduit, tee fitting and tank defining a fluid circuit for exhaust of heated air from the pressurizable device during an exhaust phase of operation wherein the device is reduced in pressure and defining a counterflow purge path for heated air through the dessicant means for removing moisture therefrom at an elevated temperature as compared to the operating temperature of said dessicant means during the removal of moisture from inlet air drawn into the system.

2. A vehicle leveling system for controlling the height of a vehicle comprising a pneumatically actuated leveler means for adjusting the level height of a vehicle, air compressor means operatively connected to said leveler means, a torque transmitting drive differential for driving a vehicle, said differential having a housing with a curved rear cover thereon, means within said differential housing including axle oil for heating said housing in response to vehicle operation, a dessicant tank supported on said differential housing including an inner wall curved to fit over said rear cover and having an inner surface, means on the outer periphery of said inner wall for connecting said dessicant tank to the differential housing and for locating said inner surface in close spaced relationship to said rear cover so that said inner surface conducts heat energy generated within said differential into said tank in response to vehicle operation, an outer wall on said tank including a flat surface thereon engaging said inner wall for defining an annular chamber within said tank, dessicant means heated by said differential and filling said chamber for removing moisture from air circulated therethrough, an inlet to said tank adapted to be connected to atmosphere for directing air into and out of said chamber, an outlet on said tank in communication with said chamber, a tee fitting connected to said tank outlet for bypassing pressurized air with respect to said tank and to direct air into said tank to flow through said chamber in counterflow relationship to the inlet airflow therethrough first air conduit means connecting one side of said tee fitting to said air compressor, second air conduit means connecting said air compressor means to said leveler means and third air conduit means operatively connecting said leveler means to the other side of said tee fitting so that said leveler means can be supplied with air from said atmosphere dried by said dessicant in one phase of operation and so that said leveler means can discharge air through said heated dessicant to purge said dessicant of moisture in another phase of operation.

* * * * *